Patented Oct. 24, 1950

2,526,743

UNITED STATES PATENT OFFICE 2,526,743

POLYMERIZATION OF UNSATURATED ETHERS

William F. Gresham, Wilmington, Del., assignor to E. I. du Pont de Nemours & Company, Wilmington, Del., a corporation of Delaware No Drawing. Application April 8, 1949,
Serial No. 86,385

9 Claims. (Cl. 260—91.1)

This invention relates to polymeric ether compositions, and more particularly to polymers of 1,2-dialkoxyethylenes, which are believed to be novel compositions of matter.

It has been disclosed recently in U. S. Patent 2,449,470 that 1,1,2-trialkoxyethanes can be prepared by reacting a dialkyl formal with carbon monoxide and hydrogen in the presence of an alkanol at a temperature in the range of 100° to 350° C. under a pressure of at least 10 atmospheres in the presence of a nickel-containing or cobalt-containing catalyst. It has also been disclosed in my copending application, S. N. 752,845, now U. S. Patent 2,479,068, filed June 5, 1947, that 1,2-dialkoxyethylenes can be prepared by heating 1,1,2-trialkoxyethane at a pyrolysis temperature preferably within the range of 300° to 450° C., whereby dealkanolization occurs and 1,2-dialkoxyethylene is produced. The present application is a continuation-in-part of the said copending application S. N. 752,845.

An object of the present invention is to prepare polymers of 1,2-dialkoxyethylenes. Another object of the invention is to provide novel methods whereby polymeric ethers can be produced. Other objects of the invention will appear hereinafter.

It has been discovered in accordance with this invention that 1,2-dialkoxyethylenes can be polymerized in the presence of boron trifluoride, or other acidic polymerization catalysts.

The polymerization of 1,2-dialkoxyethylenes in accordance with this invention takes place preferably at temperatures below room temperature, best results being obtained at temperatures below about —10° C. Friedel-Crafts type catalysts may be employed. Included among these catalysts are boron trifluoride, boron trifluoride complexes, para-toluene sulfonic acid, oxalic acid, etc. If desired, the polymerization may be conducted in an inert organic liquid medium, such as toluene, dialkyl ethers, methylene chloride, etc.

Not all readily polymerizable substances are interpolymerizable with the dialkoxyethylenes in the presence of the aforesaid catalysts. Styrene is an example of a vinyl compound which is capable of interpolymerization with dialkoxyethylenes at temperatures below room temperature in the presence of a Friedel-Crafts type catalyst. Certain other vinyl type compounds, such as methyl methacrylate, isobutylene, butadiene, etc., fail to yield interpolymers under similar polymerization conditions.

The homopolymers of the 1,2-dialkoxyethylenes, preferably those in which the alkoxy groups contain from 1 to 4 carbon atoms, are normally solid substances which dissolve readily in organic solvents and which can be obtained in the form of hard films when cast from solution in such solvents. The dimethoxyethylene polymer, for example, is soluble in benzene, methanol, acetone, carbon tetrachloride, and in hot cyclohexane, but is insoluble, or virtually insoluble, in water at temperatures above 50° C. It is also virtually insoluble in cold cyclohexane or in aliphatic hydrocarbons. One very interesting property of this polymer is its solubility in cold water, which contrasts rather remarkably with its insolubility in water at temperatures above 55° C.

It has been disclosed in the above-mentioned copending application S. N. 752,845 that there are two isomeric forms of 1,2-dimethoxyethylene. This may account for certain veriations in the rate of polymerization noted between samples of 1,2-dimethoxyethylene, which samples differ only slightly in boiling point. It has been observed, for example, that monomer boiling at 101.5° to 102° C., with a refractive index of 1.4190 at 25° C., polymerizes rapidly, and substantially quantitatively. A lower boiling cut, taken at 95° to 99° C., with a lower refractive index of 1.4150, gave only a slow, or partial, conversion to polymer. While it is quite possible that these variations can be accounted for on the assumption that two isomeric forms, differing in polymerizability, are present, the applicant does not wish to be bound by any such theory. All of the 1,2-dialkoxyethylene fractions are polymerizable, to a greater or less extent.

The invention is illustrated further by means of the following examples.

*Example 1.*—1,1,2-trimethoxyethane vapor was passed over a barium hydroxide-silica gel catalyst at a space velocity of 200 at a temperature of about 350° C. The resulting product was condensed and thereafter distilled through an efficient fractionating column. After removal of a methanol-dimethoxyethylene azeotrope the distillation temperature rose rapidly to 93° C. The main fraction boiled at 93° to 103° C. The conversion of 1,1,2-trimethoxyethane to crude dimethoxyethylene was 77.4%, and the yield, based on the quantity of 1,1,2-trimethoxyethane consumed was 88.4%. The dimethoxyethylene-methanol azeotrope, boiling at 63° to 64° C. was found to have the composition 10% dimethoxyethylene and 90% methanol. Careful fractionation of the main fraction boiling at 93° to 103° C. resulted in pure 1,2-dimethoxyethylene boiling at 102° with a refractive index of 1.4190 at 25° C.

(D line). 1,2-dimethoxyethylene was identified by hydrogenation to 1,2-dimethoxyethane with Raney nickel catalyst at 70° to 80° C. During the purification by careful distillation (to separate the cis and trans isomers), material boiling at 97° to 98.5°, refractive index 1.4121 at 25° (D line), was collected which evidently contained a predominating amount of one of the isomers. The 102° C. boiling dimethoxyethylene evidently was the other stereoisomer.

By diluting the monomer with ether it was found possible to cool the resulting solution to —50° C. without freezing out the monomer. A solution prepared in this manner was admixed with a small quantity of boron trifluoride, and the resulting mixture was kept at —50° for about one-half hour. After removal of the ether a solid polymer was obtained which was soluble in cold water but insoluble in boiling water. Viscous solutions of the polymer in cold water could be obtained very readily. A similar result was obtained when methylene chloride was used as polymerization solvent instead of diethyl ether, but a somewhat lower molecular weight polymer was produced. When the experiment was repeated using no diluent the polymerization was very rapid, and unless adequate heat removal was provided for, the polymerization got out of control and produced a black charred mass.

*Example 2.*—15.2 grams of 1,2-dimethoxyethylene was dissolved in 15.2 grams of diethyl ether in a stirred, cooled vessel fitted with vent and inlet for catalyst solution. The charge was cooled to —45° C. and then catalyst solution consisting of 23.8% $BF_3$ in diethyl ether was added in small increments over 30 minutes' time during which the temperature was kept below —25° C. The product was a very viscous, clear, water white solution. This solution was added to water at 100° C. causing evaporation of the ether and precipitation of polymer on the walls of the vessel. The hot water was poured off and the polymer was taken up in methanol, from which it was isolated by evaporation. 13.8 grams of a colorless, solid resin was recovered. When methylene chloride was used as a solvent instead of ether, a brownish-yellow colored product was obtained which seemed to be of lower molecular weight because its solution was less viscous. This polymerization was conducted at —44° to —48° C. with 0.6 ml. of 10% $BF_3$-in-ether catalyst added to 15 grams 1,2-dimethoxyethylene in 15 grams $CH_2Cl_2$ over 30 minutes' time. When n-heptane, a non-solvent for the polymer was used as a medium, the reaction was conducted at —32° to —35° C. After standing overnight the product in the reactor was solid and contained discolored specks.

Attempts to copolymerize 1,2-dimethoxyethylene with methyl methacrylate, isobutylene, and butadiene resulted in homopolymerization of the 1,2-dimethoxyethylene alone as though the comonomers were inert diluents.

When 7.5 grams 1,2-dimethoxyethylene, 7.5 grams styrene, and 15 grams ether were held at —44° to —50° C. while adding 2.5 ml. of 10% $BF_3$-in-ether catalyst over 25 minutes' time a product was obtained which gave a cloudy solution in methanol. This evidently was a copolymer of styrene and 1,2-dimethoxyethylene because polymeric 1,2-dimethoxyethylene gives a clear solution in methanol.

The examples described above are illustrative only, and numerous embodiments of the invention will occur to those who are skilled in the art. For example, it is possible to carry out the polymerization reaction continuously or batchwise and, if desired, the catalyst may be introduced intermittently during batchwise operation, or at several successive injection points, in continuous operation. Solvents are not absolutely necessary provided an adequate means for heat removal is provided. Liquid reaction media in which the monomer and/or polymer are insoluble may be employed, and suitable means may be applied for dispersing the polymer in the polymerization mixture. If desired, combinations of various polymerization catalysts may be employed, as is well-known in the polymerization art. The polymerization can be conducted at any convenient pressure. Pressures higher than atmospheric pressure are generally not necessary, excellent results being obtained at atmospheric pressure or at pressures only slightly above atmospheric pressure.

The products obtained in accordance with this invention are useful in the manufacture of pastes, thickened fluids, molded articles, etc.

Since many embodiments of the invention may be made without departing from the spirit and scope thereof, it will be understood that the invention is not limited except as set forth in the following claims.

I claim:

1. Polymeric 1,2-dialkoxyethylene in which the alkoxy groups contain from 1 to 4 carbon atoms.
2. Polymeric 1,2-dimethoxyethylene.
3. A process for polymerizing 1,2-dialkoxyethylenes which comprises subjecting dialkoxyethylene having from 1 to 4 carbon atoms in the alkoxy groups, to the action of a Friedel-Crafts type catalyst at a temperature below —10° C., whereby polymerization of the said dialkoxyethylene occurs, and thereafter separating polymerized dialkoxyethylene from the resulting mixture.
4. A process for preparing 1,2-dimethoxyethylene polymer which comprises polymerizing 1,2-dimethoxyethylene in the presence of boron trifluoride at a temperature below —10° C.
5. The process of claim 4 in which the said polymerization is carried out in the presence of an inert liquid organic medium.
6. The process of claim 5 in which the liquid organic medium is diethyl ether.
7. The process of claim 5 in which the liquid organic medium is methylene chloride.
8. A process for preparing 1,2-dimethoxyethylene polymer which comprises polymerizing 1,2-dimethoxyethylene in an inert liquid organic medium in the presence of a boron trifluoride catalyst at a temperature of —50° C.
9. The process of claim 8 in which the 1,2-dimethoxyethylene monomer has a boiling point of 102° C. at atmospheric pressure.

WILLIAM F. GRESHAM.

REFERENCES CITED

The following references are of record in the file of this patent:

UNITED STATES PATENTS

| Number | Name | Date |
| --- | --- | --- |
| 2,479,068 | Gresham | Aug. 16, 1949 |